United States Patent
Basic et al.

(10) Patent No.: US 10,090,776 B2
(45) Date of Patent: Oct. 2, 2018

(54) METHOD TO PROTECT A POWER CONVERTER ARRANGEMENT AND POWER CONVERTER ARRANGEMENT WITH A PROTECTIVE DEVICE

(71) Applicant: GE Energy Power Conversion Technology Ltd, Rugby, Warwickshire (GB)

(72) Inventors: Duro Basic, Berlin (DE); Kai Alexander Rothenhagen, Berlin (DE)

(73) Assignee: GE ENERGY POWER CONVERSION TECHNOLOGY LTD, Rugby, Warwickshire (GB)

( * ) Notice: Subject to any disclaimer, the term of this patent is extended or adjusted under 35 U.S.C. 154(b) by 0 days.

(21) Appl. No.: 15/408,443

(22) Filed: Jan. 18, 2017

(65) Prior Publication Data

US 2017/0214335 A1 Jul. 27, 2017

(30) Foreign Application Priority Data

Jan. 27, 2016 (EP) ..................................... 16152956

(51) Int. Cl.
*H02M 7/48* (2007.01)
*H02M 1/32* (2007.01)
(Continued)

(52) U.S. Cl.
CPC ........... *H02M 7/48* (2013.01); *H02M 1/0845* (2013.01); *H02M 1/32* (2013.01); *H02M 7/5387* (2013.01); *H02M 2001/0009* (2013.01)

(58) Field of Classification Search
CPC ........ H02M 1/0845; H02M 1/32; H02M 7/48; H02M 7/1557; H02M 7/1621;
(Continued)

(56) References Cited

U.S. PATENT DOCUMENTS

| 4,039,914 A | 8/1977 | Steigerwald et al. |
| 4,796,146 A | 1/1989 | Takahashi |

(Continued)

FOREIGN PATENT DOCUMENTS

| CN | 102142673 A | 8/2011 |
| DE | 37 25 515 A1 | 2/1989 |

(Continued)

OTHER PUBLICATIONS

Alegria, M.D., et al., "Grid Connection of Doubly Fed Induction Generator Wind Turbines: A Survey," European Wind Energy Conference, 2004, pp. 1-6.

(Continued)

*Primary Examiner* — Yusef A Ahmed
(74) *Attorney, Agent, or Firm* — GE Global Patent Operation; Scott R. Stanley

(57) ABSTRACT

A method is disclosed to protect a power converter arrangement with a power converter that has a DC side that is connected to a DC intermediate circuit, an AC side, and controllable switches that can be controllably switched at a high frequency to invert the DC voltage of the DC intermediate circuit into an AC voltage. A protective device that can be activated and deactivated is provided to protect the power converter from overload by connecting an external thyristor rectifier bridge with a brake resistor ($R_{b\_ext}$) to the AC side of the power converter. If a predetermined error situation is detected, the external thyristors are triggered to turn on, to activate the protective device. If it is detected that the predetermined error situation has disappeared, the external thyristors are turned off. A power converter arrangement with a device to protect against overload is also disclosed.

18 Claims, 7 Drawing Sheets

(51) Int. Cl.
  *H02M 1/084* (2006.01)
  *H02M 7/5387* (2007.01)
  *H02M 1/00* (2006.01)
(58) Field of Classification Search
  CPC ............. H02M 7/1632; H02M 7/5387; H02M 2001/0009; H02M 2001/325
  See application file for complete search history.

(56) References Cited

U.S. PATENT DOCUMENTS

| | | | |
|---|---|---|---|
| 4,885,657 A | 12/1989 | Gruning | |
| 5,127,085 A | 6/1992 | Becker et al. | |
| 5,265,002 A * | 11/1993 | Bando .................... | H02H 7/125 363/129 |
| 5,734,256 A * | 3/1998 | Larsen .................... | H02H 3/023 323/207 |
| 7,164,562 B2 * | 1/2007 | Virtanen ................. | H02M 1/32 361/18 |
| 7,414,331 B2 * | 8/2008 | Datta ...................... | H02M 1/12 307/54 |
| 7,479,756 B2 * | 1/2009 | Kasunich ............. | H02H 7/1216 318/731 |
| 7,518,256 B2 * | 4/2009 | Juanarena Saragueta ................... | H02P 6/005 290/44 |
| 8,570,003 B2 * | 10/2013 | Lu ............................. | H02P 9/10 318/268 |
| 8,576,531 B2 * | 11/2013 | Eggert .................. | H02M 5/257 2/111 |
| 8,760,095 B2 * | 6/2014 | Iwaji ...................... | H02P 29/02 318/400.17 |
| 8,957,664 B2 * | 2/2015 | Cao ........................ | G01R 31/24 324/72 |
| 2009/0001940 A1 * | 1/2009 | Sihler .................... | H02J 3/24 322/58 |
| 2012/0181955 A1 * | 7/2012 | Sodo ....................... | H02M 1/32 318/375 |
| 2013/0135908 A1 | 5/2013 | Oedegard et al. | |
| 2014/0002933 A1 | 1/2014 | Gao et al. | |
| 2014/0036418 A1 * | 2/2014 | Eichler ................ | H05K 7/1432 361/605 |
| 2014/0268942 A1 * | 9/2014 | Jiang Hafner ............ | H02J 3/36 363/53 |
| 2016/0069327 A1 * | 3/2016 | Wang .................. | H02M 5/4585 363/37 |
| 2016/0211763 A1 * | 7/2016 | Wang .................. | H02M 5/4585 |
| 2017/0047858 A1 * | 2/2017 | Hettel ................. | H02M 7/1626 |

FOREIGN PATENT DOCUMENTS

| | | |
|---|---|---|
| EP | 1 791 246 A2 | 5/2007 |
| JP | 3100805 B2 | 10/2000 |
| JP | 3286049 B2 | 5/2002 |
| WO | 2004/191085 A1 | 10/2004 |
| WO | 2012/019834 A2 | 2/2012 |

OTHER PUBLICATIONS

Chandan, M.K., "Voltage Dip Ride Through of the Double Fed Induction Generator Using Crowbar Protection in a Wind Turbine during Grid Fault," International Journal of Creative Mathematical Sciences & Technology (IJCMST), vol. 2, Issue. 1, 2012, pp. 26-34.
Naess, B.I., et al., "Ride Through Solutions for Doubly Fed Induction Generators," Retrieved from the Internet URL: http://www.elkraft.ntnu.no/eno/Papers2005/Bjarne-Australia.pdf, on Jun. 8, 2017, pp. 1-6.
Niiranen, J., "Voltage dip ride through of a doubly-fed generator equipped with an active crowbar," Nordic Wind Power Conference, Chalmers University of Technology, Mar. 1-2, 2004, pp. 1-4.
Extended European Search Report and Opinion issued in connection with corresponding EP Application No. 16152956.5 dated Aug. 3, 2016.

* cited by examiner

METHOD TO PROTECT A POWER CONVERTER ARRANGEMENT AND POWER CONVERTER ARRANGEMENT WITH A PROTECTIVE DEVICE

TECHNICAL FIELD

Embodiments of the present invention relate to a method to protect a power converter arrangement and a power converter arrangement with a protective device, in particular a method and a device to deactivate a thyristor-based protective device for a power converter arrangement.

BACKGROUND

Power converter arrangements are used in many applications, among other things for generator and motor drives. A power converter arrangement usually comprises a power converter whose direct current (DC) side is connected to a DC intermediate circuit whose alternating current (AC) side is connected with an AC voltage grid and/or an electrical load, such as, for example, a rotating electrical machine or a transformer, and that has controllable switching elements that can be controllably switched at a high-frequency to convert the DC voltage of the DC intermediate circuit into a multiphase AC voltage to feed the AC side. A controller controls the operation of the power converter in a way that is suitable for the application.

High power variable speed asynchronous machines, such as, for example, doubly fed induction machines (DFIM), are frequently controlled from the rotor side to reduce the rated power of the electronic power converter. The power converter is normally used to control the active power and reactive power of the stator of the asynchronous machine indirectly through control of the rotor current. Such systems have a large advantage over so-called full power conversion systems with an AC/DC/AC converter on the stator side, since only the slip power of the machine must be handled by the power converter. Thus, the rotor-side power converter can be dimensioned for only a fraction of the rated power of the machine, usually less than 25% of the rated power, depending on the rotor speed range. In transient situations caused, for example, by strong perturbations in the stator voltages, such as, for example, if there are voltage dips in the line voltage, short circuits, and the like, the voltage induced in the rotor can reach very high values in comparison with the normal rotor voltage that is induced at a given rotor slip. Accordingly, the rotor-side power converter can be exposed to very high surge rotor current transients that can considerably exceed the steady state values and nominal load capacity of the power converter switches. If the DC bus voltage or the rotor currents exceed certain safety limits, switching of the power converter switches must be prevented and overvoltage protection, so-called crowbar, must be activated. The protective crowbar effectively short circuits the rotor terminals, so that the currents in the power converter can quickly be reduced to zero. The protective crowbar is frequently constructed using a three-phase thyristor bridge, switches with anti-parallel thyristors or diodes, or a three-phase diode bridge and a single thyristor on the DC side. In case the overvoltage protection is turned on, it normally remains activated until the stator is separated from the grid.

To satisfy today's grid connection requirements, it is necessary to restore normal power converter operation as soon as possible. One option for achieving this is to interrupt normal power converter switching temporarily if high transient currents exceed a predetermined limit, and allow the rotor currents to continue to flow through the freewheeling diodes and charge the intermediate circuit capacitors on the DC bus. The DC intermediate circuit voltage of the power converter can then be controlled by a brake chopper that dissipates the excess energy out of the intermediate circuit to a brake resistor transforming it into heat therein. This can prevent the intermediate circuit voltage from rising to an unallowable value and destroying the intermediate circuit capacitors or other components of the circuit. Consequently, an additional resistor is effectively inserted into the rotor circuit, which may produce various advantages, such as, for example, a reduction of the rotor transient currents, an improved power factor of the rotor (increased torque production), and faster decay of the aperiodic components of the rotor transient current (smaller rotor time constant). Once the rotor surge current is reduced, the brake choppers are turned off, and the normal switching of the power converter can be restored. This allows the rotor current control to be resumed with minimal delay after the transient event.

The major disadvantage of this solution is that the freewheeling diodes of the power converter and the brake choppers must be greatly over-rated to cope with the transient rotor surge currents. The freewheeling diodes and the brake choppers must frequently be paralleled to provide the necessary surge current ratings. An alternative solution that does not require an increase of the surge current rating of the power converter involves adding, in parallel with the power converter, an additional diode bridge that is equipped with a brake chopper and a resistor. Once the current or the DC bus voltage of the power converter exceeds its limit, the external brake chopper can be activated to absorb part of the rotor current, relieving the power converter. Functionally, there is no essential difference between the brake choppers that are provided inside or outside the power converter.

Taking into consideration that the paralleled external bridge is used relatively rarely and only during stator-side transients producing excessive rotor currents that the power converter itself cannot cope with, in high-power applications it is technically and economically justifiable to replace the external diode bridge and the brake chopper by a thyristor bridge or a diode bridge and a thyristor switch. In this case, the turning on of the external brake resistor is controlled by firing the thyristors or thyristor of the external bridge. Unfortunately, once the thyristors are activated they cannot be turned off until the rotor currents naturally or forcedly fall to zero. Since the rotor transient current can contain both DC and low-frequency components, the rotor currents might not have any zero crossing for a prolonged period of time, and the thyristor turn-off time cannot be precisely controlled or guaranteed. This could be potentially problematic, as restoring normal power converter operation might be delayed due to the inability to deactivate the external brake bridge immediately after the rotor transient currents have fallen sufficiently low so that normal operation and machine current control could be resumed. Thus, it is important to provide a method that will reliably force turn off of the thyristors when normal power converter operation can be restored.

It is known to utilize the fully controllable switches of the power converter bridge to assist in turning off thyristors in the external rectifier. For example, known in the field is a protective device and a protection method for a power converter device that has several controllable switches, the protective device having an external protection circuit which is connected to the AC side of the power converter device and which comprises a three-phase rectifier bridge implemented by diodes, and a series circuit of a protective switch and auxiliary commutation means that comprises a plurality of diodes coupled in series. The series circuit is connected between the positive and the negative pole of the rectifier bridge, and the protective switch is a thyristor. Upon detection of an error in the circuit that exceeds certain conditions the protective device opens the power converter switches and triggers the thyristor protective switch to close it. This effectively short-circuits the rotor circuit, so that a short circuit current flows from the rotor, through the protective switch, and to the protection circuit. As soon as the protective device detects that the error condition has ended, it closes all three lower switches of the three-phase power converter circuit, which short-circuits all three phases of the AC voltage and connects them with the negative bus rail of the DC intermediate circuit. In space vector modulation, which is commonly used for controlling electrical rotating machines based on pulse width modulation (PWM), the latter step corresponds to the application of a zero voltage vector or passive voltage vector by the power converter, since no line-to-line voltage is measurable between the phases of the AC voltage. This is in contrast to active voltage vectors or non-zero voltage vectors that are output in other breaker switch positions, which then result in line-to-line voltages between the phases that are different from zero. Thus, the use of a zero voltage vector by the power converter essentially short-circuits the external rectifier bridge, wherein the power converter practically takes over the entire rotor current, after which turning off of the thyristor protective switch is ensured by discharging an additional capacitor which is connected in parallel to the auxiliary commutation device.

Also known in the art is a converter system and a method to operate a converter system for switching at least three voltage levels, wherein a by pass circuit comprising external brake resistors supplied via a thyristor bridge is provided. In case of a fault in which the current through the converter unit exceeds a predetermined threshold value, the thyristors are turned on by the application of a turn-on signal, so that the AC side of the converter unit is bypassed by the external resistors. The external thyristor bridge is turned off in two steps: First, a zero voltage vector is applied by the converter, effectively short-circuiting the external thyristor bridge, to redirect the current to the converter and substantially reduce the thyristor currents. Then, by closing two auxiliary power switches the thyristor bridge is connected (via auxiliary resistors) to the DC intermediate circuit and turned off by applying inverse voltage across the thyristors.

In the prior art, when the thyristors are turned off the power converter is used in a passive manner to relieve the external rectifier from the current, producing a short circuit, while the actual thyristor switch turn off is ensured by additional means, such as, for example, by an additional DC-side capacitor or auxiliary switches. This increases the expense both for the circuitry of the protective device and also for the protection method. There is a need to reduce this expense.

It is an object of the invention to eliminate the shortcomings of the prior art and to provide an improved method and an improved device to protect a power converter arrangement. In particular, it is an object of present invention to provide a method to protect a power converter arrangement and a power converter arrangement with a protective device, which allow deactivation of the protective device with a small delay and with reduced expense.

BRIEF DESCRIPTION

This is accomplished with the method to protect a power converter arrangement and with a power converter arrangement having the features disclosed herein.

In accordance with a first aspect of the invention, a method is provided to protect a power converter arrangement. The power converter arrangement has a power converter device that has a direct current DC side connected with a DC intermediate circuit, an alternating current (AC) side, and controllable switching elements that can be controllably switched at a relatively high frequency to convert the DC voltage of the DC intermediate circuit into a multiphase AC voltage to feed the AC side. The method provides a protective device, that can be activated and deactivated, to protect the power converter device from overload by connecting a rectifier circuit having rectifier elements, at least one of which is formed by thyristors, to the AC side of the power converter device, and connecting a bypass branch to a DC side of the rectifier circuit, the bypass branch having a brake resistor that serves, when necessary, to transform energy dissipated from the AC side of the power converter device into thermal energy. The method also provides that in case a predetermined error situation is detected, the thyristors of the rectifier circuit are triggered to turn them on, to activate the protective device, to rectify, by means of the rectifier circuit, AC voltage energy from the AC side of the power converter device and feed it to the bypass branch including the brake resistor. The method also provides that if disappearance of the predetermined error situation is detected, the thyristors of the rectifier circuit are turned off by ending the triggering of the thyristors and actively controlling the switching elements of the power converter device to produce a sequence of voltage pulses of suitable polarity and amplitude to serve as a thyristor turn-off sequence which is applied to the protective device to force commutation of the current from the protective device to the power converter device to deactivate the protective device.

Thus, according to an embodiment of the invention, the external rectifier bridge with the thyristors included therein and the brake resistor is actively turned off from the AC voltage (AC) side by the power converter by outputting non-zero voltage vectors. Applying special sequence of active (non-zero) voltage pulses through the rectifier bridge with the thyristor switches immediately after ending the application of the thyristor gate currents can quickly and securely force the thyristors to turn off and the current to commutate to the power converter under all operating conditions. To do this, the inventive method synthesizes and uses the active voltage vectors in an optimized thyristor turn-off sequence, taking into consideration the power converter topology and knowledge about the conducting states of the thyristors, to force the thyristors in the rectifier bridge to turn off while placing minimum stress on their components.

Embodiments of the inventive method can have one or more of the following:

The method can provide that if the predetermined error situation is detected, the closed switching elements of the power converter device are controlled to open, and then all switching elements are kept open until the disappearance or absence of the predetermined error situation is detected. This protects the switching elements, especially semiconductor devices such as IGBTs, MOSFETs, thyristors, or similar devices during the error situation.

The thyristor turn-off sequence can in particular be produced on the basis of knowledge about the conducting or nonconducting states of the individual thyristors of the rectifier circuit. For this reason, it may be beneficial for the polarities and amplitudes of the currents in the protective device to be monitored, that is, either directly measured or derived from other sensed currents of the power converter arrangement and the rotor, to determine the suitable sequence of voltage pulses having the required polarity and amplitude to turn off the thyristors. The monitored currents can also be used to detect the occurrence or appearance and absence or disappearance of the predetermined error situation, such as, e.g., very strong transient surge currents in the case of strong perturbations of the stator voltage in the application for the control of doubly fed induction machines, e.g., in pump storage systems and wind power plants. In an embodiment, the currents flowing from the respective phase lines on the AC side to the rectifier branches of the rectifier bridge can be directly measured.

In an embodiment of the invention, to provide surge protection an internal brake chopper device is additionally provided that monitors intermediate DC circuit voltage of the power converter device and protects it. The brake chopper device has at least one internal brake resistor that transforms the excess energy in the DC intermediate circuit into thermal energy, and at least one switch that can be controlled, for example, by pulse-width modulation (PWM). In case of an error, if too much current is introduced into the DC bus and cannot be fed into a grid, for example, so that the intermediate circuit voltage rises to an unallowable level, the switch can be controlled by PWM to selectively allow a current flow through the at least one internal brake resistor, to consume the excess energy in the brake resistor. The protective device is activated only once the duty ratio of the switch of the brake chopper device reaches at least almost 100%, that is, the switch is essentially continuously closed, and this is not sufficient to limit the rise in the DC bus voltage. Once the protective device is activated, the internal brake resistor of the brake chopper circuit and the external brake resistor of the protective device work in parallel, for effective consumption of the excess energy.

To allow this, in an embodiment, the power converter device also comprises means of rectifying the AC voltage of the AC side and feeding it into the DC intermediate circuit. These means can be, for example, freewheeling diodes, each of which is connected antiparallel to the switching elements of the power converter device. Such freewheeling diodes are already integrated with IGBT switches in voltage source converters.

In an embodiment of any of the methods mentioned above, inductors can be further arranged between the power converter device and the protective device, to limit the rate of change of the commutation current. This mitigates possible strong transients and overloads outside of the safe operational area of the thyristors during the reverse recovery. In an embodiment, suitably dimensioned dv/dt filter inductors, which re provided in the phase lines, can be used as the commutation inductors to limit rate of change of the thyristor currents (di/dt rate) when the thyristors are turned off.

Further developments of any of the above-mentioned methods are designed to turn off the thyristors in an especially careful manner producing lowest stress for the components. This can be done using various measures. E.g., the current commutation speed di/dt when the thyristors of the protective device are turned off can be limited by controlling the switching elements of the power converter device to apply voltage pulses with a reduced amplitude at the terminals of the protective device. In an embodiment, voltage pulses with the smallest possible amplitude $V_{conv}$ are applied to the protective device; this amplitude is governed by the following equation:

$$V_{conv} = \frac{V_{dc}}{m-1}.$$

Here $V_{dc}$ is the voltage of the DC intermediate circuit and m is the number of voltage levels of the multi-level power converter. In a three-level power converter (m=3), the smallest voltage level that can be applied is equal to half the intermediate circuit voltage ($V_{dc}/2$), while with more than three levels there is a greater degree of freedom to use smaller commutation voltages.

In the above-mentioned embodiment it is also possible, before actively turning off the thyristors, to limit the current through the bypass branch and the external brake resistor having the resistance $R_{d\ ext}$ to a value $I_{clamp}$ by applying a voltage pulse with reduced amplitude. This allows the thyristors to be turned off in a reliable and careful manner with the predefined maximum current and the maximum di/dt rate. In an embodiment, applying a voltage pulse having the smallest possible amplitude $V_{conv}$ limits the current through the external rectifier circuit and the bypass branch to the value:

$$I_{clamp} = \frac{V_{conv}}{R_{b\ ext}}.$$

In another embodiment of any of the above-mentioned methods, applying the thyristor turn-off sequence can involve applying at least a first voltage pulse having a certain voltage amplitude and polarity between a first phase line and a second phase line, to which the rectifier bridge is connected, afterwards applying another voltage pulse having the reverse polarity between these phase lines, and subsequently applying yet another voltage pulse having a certain voltage amplitude and polarity between the first and second phase lines, which are connected in parallel with one another, and a third phase line, to which the rectifier bridge is connected. If it is found that the currents through the external rectifier device are still high, this can be followed by yet another step of applying a last voltage pulse, but with reverse polarity, between these phase lines. Applying two to four voltage pulses of the inventive thyristor turn-off sequence securely turns off all thyristors of the external rectifier circuit. In an embodiment, the duration of each applied voltage pulse of the thyristor turn-off sequence is selected in advance, and is equal to at least the sum of the current commutation time and the blocking voltage recovery time of the thyristors used.

In any embodiment of the inventive method mentioned above, once the fault situation is finished and the current has commutated from the protective device to the power converter device, a normal operating state may be resumed in which the controllable switching means of the power converter device are controlled at a high frequency, such as by pulse-width modulation, to invert the direct voltage of the DC intermediate circuit.

In accordance with another aspect of the invention, a power converter arrangement is provided, which comprises a power converter device, a protective device that can be activated and deactivated to protect the power converter device from overload, and a control device. The power converter device has a direct current (DC) side that is connected with a DC intermediate circuit, an alternating current (AC) side, and controllable switching elements that can be controllably switched at a high frequency to convert the direct voltage of the DC intermediate circuit into a multi-phase AC voltage to feed the AC side. The protective device has a rectifier circuit which is connected to the AC side of the power converter device and which comprises rectifier elements, at least some of which are thyristors, and a bypass branch that is connected to a DC side of the rectifier circuit, the bypass branch having a brake resistor that serves, when necessary, to transform energy dissipated from the AC side of the power converter device into thermal energy. The control device is configured to control the thyristors of the rectifier circuit to selectively turn the thyristors on and off to activate or deactivate, respectively, the protective device. In the activated state, AC energy from the AC side of the power converter device is rectified by means of the rectifier circuit and fed to the bypass branch with the brake resistor. The control device is configured to deactivate the protective device to selectively turn off the thyristors of the rectifier circuit by actively controlling the switching elements of the power converter device to produce a sequence of voltage pulses of suitable polarity and amplitude to serve as a thyristor turn-off sequence, which is applied to the protective device to force commutation of the current from the protective device to the power converter device. The controller can, by applying non-zero voltage vectors taking into consideration the power converter topology that is used and the detected conducting states of the thyristors, apply special active voltage vectors through the rectifier circuit immediately after the gate control pulses are removed from the thyristors, to force the thyristors to turn off and the current to commutate to the power converter in an gentle active manner that is careful for the components of the power converter arrangement under all operating conditions.

Embodiments of the inventive power converter arrangement can comprise those of the methods according to the first aspect of the invention, so that the above-mentioned advantages also benefit the power converter arrangement. Embodiments of the power converter arrangement can comprise one or more of the following:

In one embodiment, the control device for activating and deactivating the thyristors is part of the normal controller for the power converter device, which in the normal operating mode controls the switching elements at a high frequency, such as by pulse-width modulation, to invert the DC voltage of the DC intermediate circuit.

The control device of any type mentioned above can be configured to recognize predetermined error situations, such as, for example, large surge currents due to strong rotor current transients, e.g., in an application for a rotor circuit of a doubly fed induction machine, and exceeding an allowable intermediate circuit DC voltage, etc., and thereupon to control the closed switching elements of the power converter device to open them, wherein the control device then keeps all switching elements open until it detects that the error situation has disappeared.

To detect the occurrence and disappearance of the error situations and to synthesize and apply the suitable thyristor turn-off sequence, the control device is configured to monitor the polarities and amplitudes of the currents in the power converter arrangement, including the currents in the protective device. The currents flowing to the rectifier branches of the rectifier device from the phase lines of the AC side of the power converter device can be sensed directly, or the currents can be derived from other currents sensed in the power converter arrangement.

The power converter device of any of the above-mentioned power converter arrangements can also have means for rectifying the AC voltage of the AC side and feeding it into the DC intermediate circuit. These means of rectification can be especially effective to feed the rotor current of an asynchronous machine into the DC intermediate circuit and then further through a line-side power converter into a grid, or to consume it in a brake chopper.

In a further variant of any of the above-mentioned power converter arrangements, the power converter device further comprises an internal brake chopper circuit that monitors and protects the intermediate circuit voltage, the brake chopper circuit including at least one internal brake resistor that transforms excess energy in the intermediate circuit into thermal energy, and at least one controllable switch that selectively allows or prevents a current flow through the at least one internal brake resistor. In the field of technology, there are many other known configurations of brake chopper circuits that can be used here.

In an embodiment, the power converter device has an m-level n-phase power converter, where $m \geq 2$ and $n \geq 3$. Different modifications of different power converter topologies, e.g., NPC or NPP power converters, can be used.

In any of the above-mentioned power converter arrangements, inductors can be arranged between the power converter device and the protective device, to limit rate of change of certain variables, such as, for example, the voltage rise rates and rates of change of the commutation currents.

At least some rectifier elements of the external rectifier circuit can be simple diodes. In an embodiment, the rectifier circuit is formed by a multi-phase thyristor bridge in which all rectifier elements are thyristors, such as a B6 thyristor bridge.

In an application, the power converter arrangement is configured to control a variable speed doubly fed induction machine, the protective device protecting the rotor circuit of the induction machine.

Further details on embodiments, aspects, and advantages of the invention follow from the drawing, the description, and the appended claims.

BRIEF DESCRIPTION OF THE DRAWINGS

The invention is described below in more details in connection with embodiments with reference to the attached drawings. It is understood that the drawings only illustrate exemplary embodiments of the invention for the purposes of illustration, but do not limit the invention in any way. In the figures.

DETAILED DESCRIPTION

Figure 1:
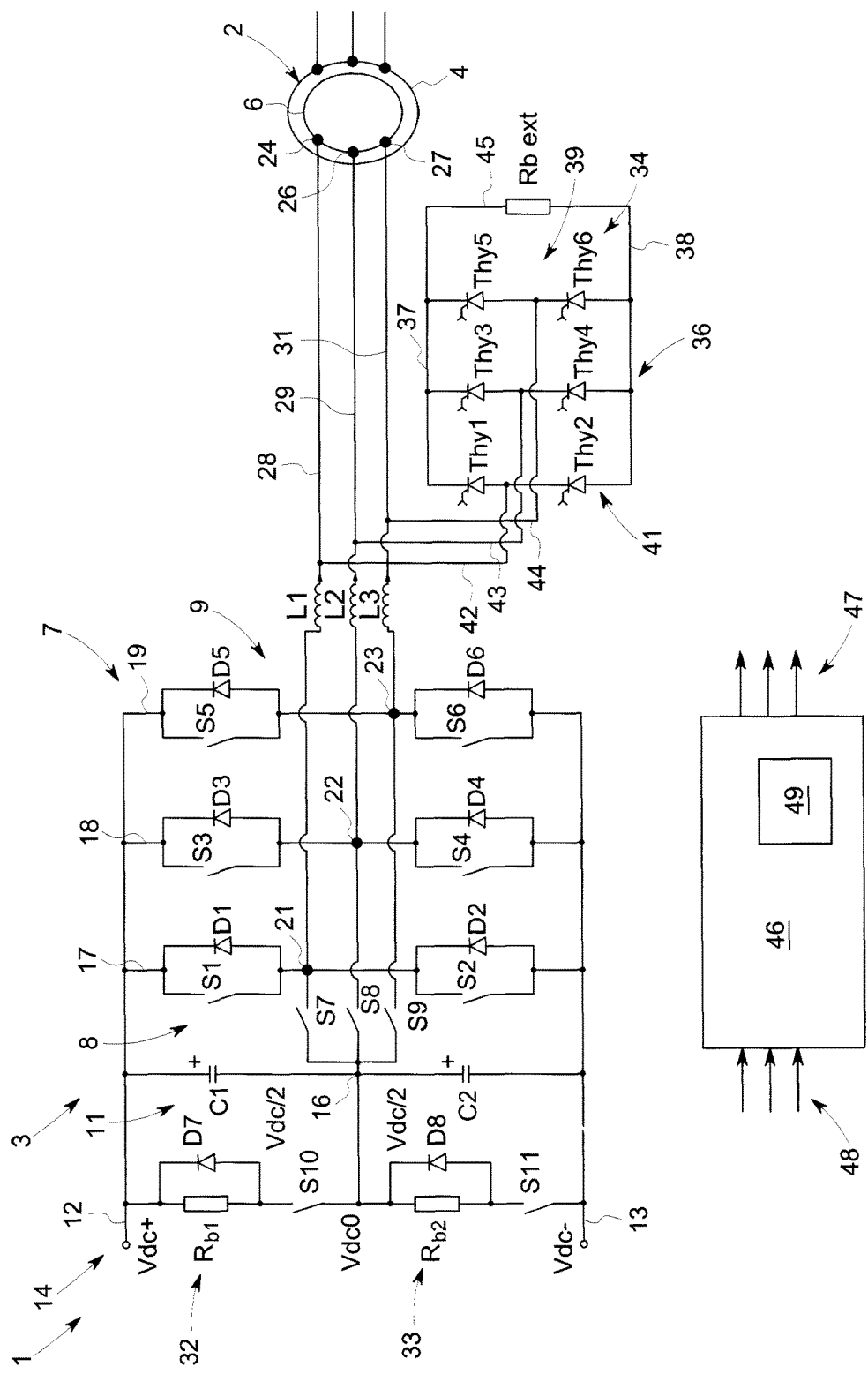
FIG. 1 is a block diagram of an exemplary system with a power converter arrangement and a doubly fed induction machine in which an embodiment of the invention can be implemented, in a greatly simplified representation.

FIG. 1 shows a simplified block diagram of an exemplary drive system 1 in which an embodiment of the invention can be implemented. The illustrated system 1 is a so-called DFIM system with a doubly fed induction machine (doubly fed induction machine or generator, DFIG) 2, whose rotor current can be controlled through a power converter arrangement 3. Even though embodiments of the invention are described below in connection with a DFIM system, is the embodiments are equally applicable to other systems in which a power converter arrangement is used to produce, from its direct voltage (DC) input, an alternating voltage or alternating current (AC) output at its output, with which a connected load can be fed, if the load can, in case of malfunction, produce surge currents or other current or voltage transients that could damage the power converter arrangement. In this respect, the area of application of embodiments of the invention is not limited to use in connection with doubly fed induction machines only.

In asynchronous machines or generators the slip power from the rotor circuit can be fed back through a power converter into the grid, or power is fed to the rotor. This can be used for large drives with a variable limited rotational speed range, such as wind power generators pumps, or fans. The asynchronous machine 2 usually has a stator 4 that can, for example, be directly connected with a current grid or the like, and a rotor 6 that is connected with the power converter arrangement 3.

The power converter arrangement 3 has a power converter device 7, hereafter also referred to as a power converter, which has, in the exemplary embodiment illustrated in FIG. 1, a 3-level power converter topology. In particular, the power converter device 7 here is a 3-level 3-phase power converter, which has a DC side 8 and an AC side 9, the DC side being connected with a DC intermediate circuit 11. The DC intermediate circuit 11 is formed by a series connection of intermediate circuit capacitors C1, C2, which are connected between a positive 12 and a negative 13 DC rail of a DC bus 14. The positive DC rail 12 has the positive direct voltage Vdc+, while the negative DC rail 13 conducts the negative voltage Vdc−. The connection point 16 between the intermediate circuit capacitors C1, C2, also called capacitor midpoint, conducts the zero voltage and can also be grounded, depending on the application.

The power converter device 7 has three half bridge branches 17, 18, 19, each of which is connected between the positive and negative DC rail 12, 13. Each half bridge branch 17-19 has a series connection consisting of two controllable switching elements, which can be gated at high frequency, to invert the direct voltage of the DC side 8. The controllable switching elements S1-S6 are formed especially by power semiconductors, such as, for example, insulated-gate bipolar transistors (IGBTs), power MOSFETs, gate turn-off thyristors (GTO), or integrated gate commutated thyristors (IGCTs).

A first pair of switch elements S1, S2 is arranged in the half bridge branch 17 and has a bridge tap 21 that is formed by the connection point of switch elements S1, S2. Similarly, a second and third pair of switches S3, S4 and S5, S6, respectively, are provided, each in series with one another and between the DC rails 12, 13 with bridge taps 22, 23 at the connection points of the switches. Opening and closing the respective switches S1-S6 can apply the positive potential Vdc+, the negative Vdc− potential, or the capacitor midpoint potential Vdc0 to each respective bridge tap 21, 22, 23.

Each switch element S1-S6 has one parallel rectifier diode D1-D6 connected in the antiparallel direction. The diodes D1-D6, which are also called freewheeling diodes, serve as a diode bridge if power from the rotor circuit is fed through the power converter into the grid, or if switching of the power converter device 7 is disabled.

As can also be seen from FIG. 1, additional switches S7, S8, or S9 are inserted between each respective bridge tap 21, 22, 23 and the capacitor midpoint connection point 16. The switches S7-S9 make it possible to selectively connect each of the respective bridge taps 21-23 to the midpoint potential VDC0, or to disconnect them from it.

The bridge taps 21-23 form the AC connections of the power converter device 7 or are connected with it. The AC connections 21, 22, 23 have the rotor connections 24, 26, 27 of the doubly fed induction machine 2 connected to them through phase lines 28, 29, 31. Each phase line 28, 29, 31 has an inductor L1, L2, and L3, respectively, arranged therein. The filter inductors L1, L2, L3 serve to limit the voltage rise rates in the phase lines 28-31. As was already mentioned, the AC side outputs of the power converter 7, that are formed by the bridge taps 21, 22, 23, can be selectively connected, by triggering the switches S1-S9, with the DC bus rails 12, 13 and with the capacitor midpoint 16, that is, in the illustrated exemplary three-level power converter, with the three potentials Vdc+, Vdc0, and Vdc−. In this way, it is possible for the power converter to change potentials of the AC output phase lines 28, 29, 31 of the power converter 7 in several steps, depending on the number of levels of the power converter; in the example shown, in three levels (0, Vdc+, and Vdc−). In normal operation, the rotor current of the rotor 6 of the asynchronous machine 2 is controlled using the switch and using pulse-width modulation (PWM) to control the rotor voltage. In normal operation, the power absorbed or delivered by the rotor 6 can be balanced by the energy that is delivered or absorbed by an additional power converter that can be formed, for example, by a self-commutated, actively controlled grid inverter that is connected between a grid and the common DC bus or DC intermediate circuit 11 of the rotor-side power converter 7. For clarity, the grid-side power converter is not shown in FIG. 1.

As also follows from FIG. 1, brake chopper devices 32, 33 are connected to the DC bus between the DC bus rails 12, 13 and serve to monitor and protect the intermediate circuit voltage. A first brake chopper circuit 32 is connected between the positive DC rail 12 and the capacitor midpoint connection 16 and has a brake resistor $R_{b1}$ and a switch S10 arranged in series therewith. A diode D7 is connected in parallel with the brake resistor $R_{b1}$, with its forward direction toward the positive DC rail 12. The brake resistor $R_{b1}$ serves, when necessary, to transform excess energy from the intermediate circuit 11 into thermal energy, the switch S10, which can be actuated by pulse-width modulation, for example, alternatively allowing or preventing the current flow through the internal brake resistor Rb1.

The second brake chopper device 33 is connected between the capacitor midpoint 16 and the negative DC rail 13 and is similarly configured with a brake resistor $R_{b2}$, an controllable switch S11 arranged in series therewith, and a diode D8 arranged in parallel with the brake resistor $R_{b2}$, the diode having its forward direction pointing toward the capacitor midpoint connection 16.

In addition to the brake chopper devices 32, 33 another protective device 34 is provided to protect the power converter device 7 from overload. Here the protective device 34 has an external thyristor rectifier bridge 36, which is connected to the rotor connections in parallel with the power converter 7. In particular, the external thyristor rectifier bridge is connected to the phase lines 28, 29, 31 such that the dv/dt filter inductors L1, L2, L3 are positioned between the power converter 7 and the rectifier bridge 36. It is also possible to insert additional inductors between the dv/dt filter L1, L2, L3 and the rotor connections 24, 26, 27 or in series to the external rectifier bridge (into connections 42, 43, and 44).

Here the rectifier bridge 36 is formed in usual manner by a three-phase thyristor bridge with six thyristors Thy1, Thy2, Thy3, Thy4, Thy5, and Thy6, that are connected into a rectifier bridge in the form of a B6 thyristor circuit. In particular, the upper three thyristors in FIG. 1 Thy1, Thy3, Thy5 have their cathodes connected together to form a first DC line terminal 37, while the lower thyristors in FIG. 1 Thy2, Thy4, Thy6 have their anodes connected together to form a second DC line terminal 38 of the DC side 39 of the rectifier bridge 36. On the AC side 41 of the rectifier bridge 36, the midpoint of each serially connected thyristor pair Thy1, Thy2; Thy3, Thy4; and Thy5, Thy6 is tapped and connected with the respective phase lines 28, 29, and 31 through branch lines 42, 43, and 44, respectively.

On the DC side 39 of the external rectifier bridge 36, an external brake resistor $R_{b\_ext}$ is connected in a bypass branch 45 between the terminals 37, 38.

As can also been seen from FIG. 1, a controller 46 is provided to control the power converter arrangement. In normal operating mode, the controller 46 controls the power converter device 7 at a high frequency, such as by pulse-width modulation (PWM), to invert the DC voltage of the DC intermediate circuit, to feed the rotor 6 of the asynchronous machine 2. To accomplish this, the controller 46 is electrically connected with the control terminals of the switches S1-S9, and also with those of the switches S10, S11, to selectively close or open them by applying suitable control signals to their control terminals. For clarity, the individual connections are not shown in FIG. 1. The control outputs of the controller 46 are only indicated with the reference number 47. The controller 46 is also connected, through the control outputs 47, with the thyristors Thy1-Thy6 of the external rectifier bridge 36 of the protective device 34, to turn them on (fire them) and, where applicable, to keep them in the turned-on state by applying suitable current pulses or signals to the gate terminals.

The controller 46 also has multiple control inputs 48 through which the controller 46 receives signals that are sensed by measurement devices such as voltage and current sensors, in the entire system 1. For clarity, the measuring devices and associated transmission connections are omitted from FIG. 1. It is possible to sense the intermediate circuit voltage over the intermediate circuit capacitors C1, C2, phase currents in the phase lines 28, 29, 31, currents flowing through the branch lines 42, 43, 44 to the rectifier bridge 36, or currents in the individual branches of the rectifier bridge 36, and other parameters.

In addition to a control logic for gating the switching elements S1-S9 of the power converter device 7 in normal operation, the controller 46 also has an additional control logic 49. The control logic 49 serves to monitor operating conditions and detect predetermined error situations that could lead to an overload of the components of the power converter arrangement 3, and in this case to activate the protective device 34 to protect the power converter arrangement 3. To accomplish this, the control logic 49 implements a method to protect the power converter arrangement 3, wherein this method is explained in detail in connection with FIG. 2.

Figure 2:
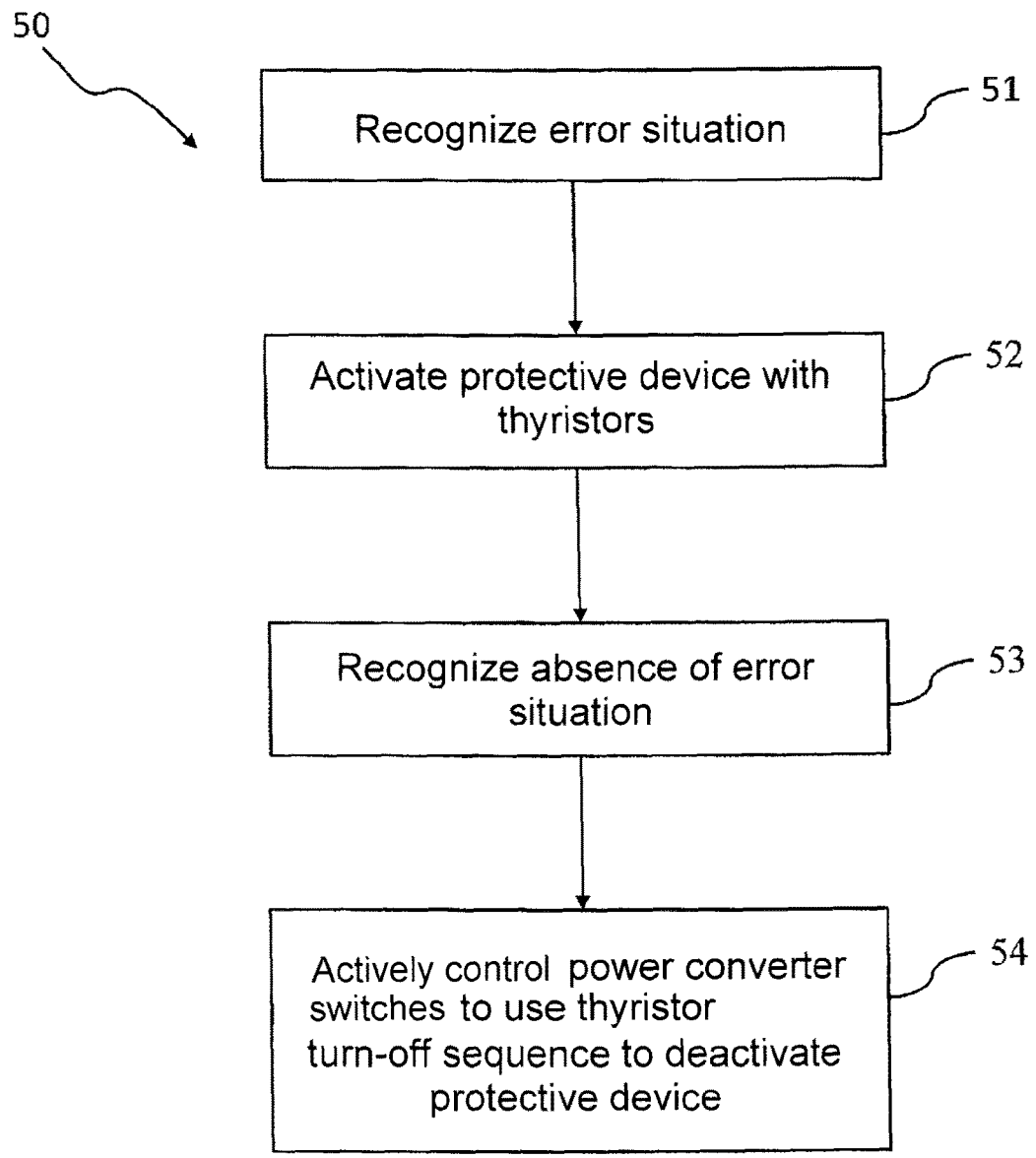
FIG. 2 is a flow chart of a method for protecting the power converter arrangement in accordance with an embodiment of the invention, in a simplified representation.

FIG. 2 shows a flow chart of a method to protect a power converter arrangement, such as, for example, the power converter arrangement 3 shown in FIG. 1, according to embodiments of the present invention. The method is carried out in predetermined error situations, e.g., by the controller 46 or another, separate control device. For example, in the case of sudden perturbations in the stator voltages in a DFIM system, such as, for example, the system 1 shown in FIG. 1, large voltages are induced in the rotor. Since the power converter only has a limited voltage range, which is also limited by the DC bus voltage Vdc, the power converter 7 cannot maintain the rotor current control, and large surge currents are introduced from the rotor side, so that the rotor 6 behaves as a current source during these transient events. At first, these surge currents are completely absorbed by the power converter. However, as soon as the rated power of the power converter switches S1-S9 is exceeded, their switched mode must be interrupted to protect them from destruction. The control device recognizes that the allowable working range has been exceeded on the basis of the measured parameters that are fed through the control inputs 48, after which the controller 46 triggers all switches S1-S9 of the power converter device 7 to cause them to open.

The rotor surge current then flows on into the power converter through the freewheeling diode bridge D1-D6, which rectifies the current and charges the DC bus. The grid-side power converter (not shown in FIG. 1) is usually unable to conduct such a large amount of surge current away to the grid, especially if the grid voltage is perturbed and significantly reduced. Usually, dips in the grid voltage are the major source of the rotor side transient surge currents. To prevent the DC bus voltage from rising excessively, the controller 46 activates the first and second internal brake choppers 32, 33, so that power fed into the DC bus of the power converter 7 can be consumed in the internal brake resistors Rb1, Rb2. The brake resistor thus added to the rotor circuit helps attenuate the aperiodic components of the rotor current, the rate of their reduction being accelerated and the time necessary to restore normal operation being reduced.

If the rotor current transients are very strong, even the freewheeling diodes D1-D6 of the power converter 7 and the internal brake chopper devices 32, 33 can be overloaded. Such an error situation is recognized by the controller 46, as is indicated by step 51 in the flow chart shown in FIG. 2. For example, the controller can recognize that the brake chopper devices 32, 33 have almost maximized their power consumption in the internal brake resistors Rb1, Rb2, so that, for example, the switches S10, S11 are triggered with a pulse duty ratio that is almost 100% or equal to 100%, that is, they are essentially continuously closed. If this is not sufficient to prevent a further rise in the DC bus voltage, it is recognized that there is an error situation (step 51) and that the protective device 34 should be activated (step 52).

For this reason, the external thyristor rectifier bridge 36 with the external brake resistor $R_{b\_ext}$ is then activated. To accomplish this, all six thyristors Thy1-Thy6 are fired or turned on by the application of a current pulse or a permanent current signal to their gate terminals. In this state, there are two rectifier bridges working in parallel, one formed by the freewheeling diodes D1-D6 and the other formed by the thyristors Thy1-Thy6 which work together in parallel with the brake resistors $R_{b1}$, $R_{b2}$ or $R_{b\_ext}$ to transform the excess energy supplied by the rotor 6 into thermal energy. This protects the freewheeling diodes D1-D6 of the power converter device 7 and the internal DC brake chopper devices 32, 33, since a considerable part of the transient rotor currents flows into the external rectifier bridge 36. The pulse duty ratio of the switches S10, S11 of the brake chopper devices 32, 33 can be substantially reduced. The internal brake chopper devices 32, 33 are now able to control the voltage across the DC bus of the power converter 7 to a predetermined level.

Once the rotor voltage and current transients have decayed, the current absorbed by the converter bridge D1-D6 gradually declines to zero, and all the rotor current then flows only through the external rectifier bridge 36. As soon as the rotor current is sufficiently reduced, it can be transferred back to the power converter 7 to resume normal switching operation of the power converter 7 as soon as possible. The absence of the error state is recognized by the controller 36, as is indicated in step 53 in FIG. 2.

Before normal power converter operation is resumed, the external rectifier bridge 36 must first be deactivated. The thyristors Thy1-Thy6 of the external rectifier bridge 36 cannot be reliably turned off in a predefined time frame simply by removing the gate firing pulses from the external bridge thyristors. The thyristor current must fall to zero naturally or be forced down to zero to turn off the thyristors. Since the rotor currents contain residual aperiodic and low-frequency (slip-frequency) current components, it is practically impossible to wait for the natural zero crossing of the rotor currents to turn off the thyristors Thy1-Thy6 of the external thyristor bridge 36. One possible way to force the external thyristors Thy1-Thy6 to turn off would be to open the rotor circuit. However, this would require additional switches or rotor connections and it would take a non-negligible time to turn them on and off. Therefore, it may be desirable to provide means for forced turn off of the thyristor bridge 36.

In accordance with the inventive method 50 shown in FIG. 2, the thyristors of the external rectifier bridge, e.g., Thy1-Thy6 in FIG. 1, are forced to turn off through the bridge AC side using the power converter switches S1-S9, by actively controlling them to produce a sequence of voltage pulses, the thyristor turn-off sequence, before the normal operation of the power converter 7 is resumed. The thyristor turn-off sequence is designed so that voltage pulses of suitable polarity and amplitude (suitable magnitude) are applied to the rectifier bridge 36 through the power converter switches S1-S9 to force commutation of the rotor current from the external rectifier bridge 34 to the power converter 7. Thus, as soon as the controller detects that the rotor transients have sufficiently decayed and normal power converter operation can be safely resumed, the triggering of the thyristors to keep them conducting is ended and a short thyristor turn-off sequence is applied by the power converter 7. After that, normal power converter operation can be resumed practically without perturbation of the rotor currents.

Figure 3:
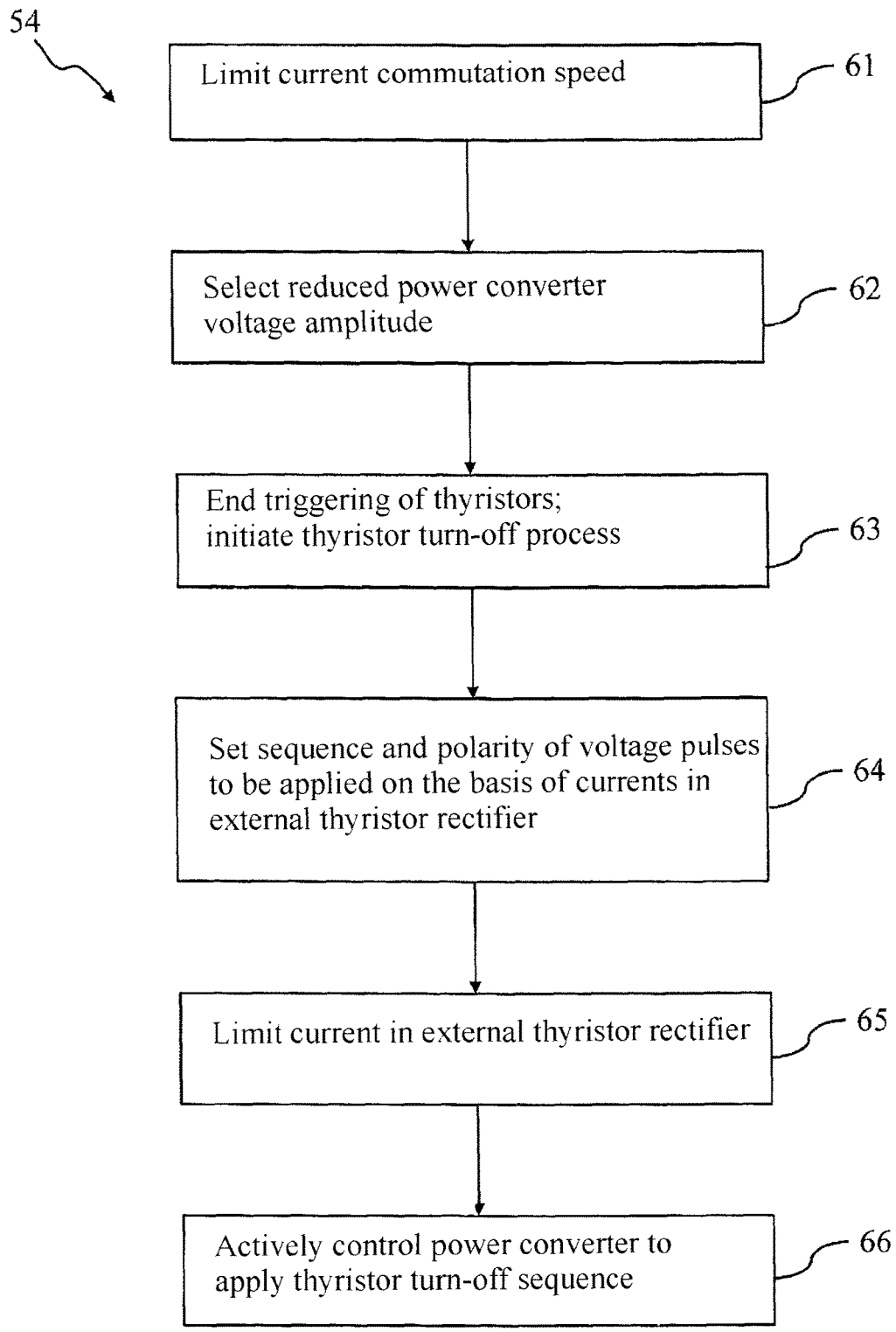
FIG. 3 is a flow chart illustrating in greater detail individual steps of the method for protecting the power converter device shown in FIG. 2 in accordance with an exemplary implementation, in a simplified representation.

Step 54, as shown in FIG. 2, of the method according to embodiments of the invention is shown in more detail in a flow chart in FIG. 3. As already mentioned, in an embodiment of the method the thyristors (e.g., Thy1-Thy6) of the external rectifier bridge 36 are sequentially turned off in several steps by applying voltage pulses of the power converter with specific amplitude and polarity during predefined times. The thyristor turn-off sequence (the states of the switches S1-S9) is synthesized on the basis of an evaluation of the conducting states of the thyristors (e.g., Thy1-Thy6). The conducting and non-conducting states of the thyristors, including their current's magnitude and direction of flow, can be estimated by monitoring the measured external rectifier currents in the branch lines 42, 43, 44. The currents in the external rectifier bridge 36 can also be indirectly derived from measurements of the rotor and power converter currents.

In the embodiment of the method according to the invention, as illustrated in FIG. 3, the external rectifier thyristors are turned off by actively controlling the power converter power switches to provide voltage pulses, that is active voltage vectors, through their AC terminals. This can be done with minimal load on the components of the power converter arrangement using the following steps:

First, in a first optional step 61, a measure is taken to limit the current commutation speed when the thyristors are turned off. It is important to minimize the rate of change of the thyristor currents to prevent strong current transients during reverse recovery. Such current transients could exceed safe operational area of the thyristors. This can be prevented by inserting a defined and sufficiently high inductance in the commutation loop. For example, an inductance is inserted between the power converter 7 and the external rectifier bridge 36, which influences or controls the rate of change of the commutation current. The inductance can also serve another purpose. In this case the dv/dt filter inductors, e.g., the filter inductors L1, L2, L3 (for simplicity, it can be assumed that L1=L2=L3=L) shown in FIG. 1, can, if suitably dimensioned, also serve as the commutation inductances. It is also possible to use other commutating chokes or inductors, even those that use a common current, e.g., in parallel power converters.

In the next step 62, which can also be carried out before step 69, a reduced amplitude of the power converter voltage pulses is selected. For successful thyristor commutation, it is important to reduce the voltage amplitude, since that is what determines the maximum commutation speed of the current (di/dt) or the rate of change of the thyristor current during the turn-off. To ensure that the external thyristors can be turned off, the power converter voltages should be only just slightly higher than the voltage drops in the dv/dt inductors and power converter switches for a given rotor current.

In an embodiment, the smallest possible amplitude, that is the smallest voltage level that the multi-level power converter can provide, is used. If the power converter is a multi-level power converter with m levels, this smallest voltage amplitude is:

$$V_{conv} = \frac{V_{dc}}{m-1}.$$

This makes it possible to reduce the rate of change of the thyristor current di/dt and associated transients during reverse recovery. For example, in the case of a 3-level inverter (m=3) it is possible to use the smallest voltage level of $V_{conv}=V_{dc}/2$. If the power converter has more than three levels, lower commutation voltages can be selected and applied.

Once it is detected, e.g., by the controller 46, that the rotor current transients have sufficiently decreased, in the next step 63 the triggering of the external thyristors through their gate-electrodes can be stopped and the method to turn off the thyristor rectifier bridge can be initiated.

Before that, at the same time, or after that, the measured or derived information about the current in the external rectifier is evaluated and used to determine the conducting state of the thyristors in the external rectifier bridge and, on the basis of this information, set the necessary sequence and polarity of the voltage pulses that the power converter should generate to force the thyristors to reliably turn off after that. This is shown as step 64 in FIG. 3.

In step 65, the current of the external rectifier is reduced or clamped to a fixed value prior to the commutation to reduce the charge stored in the thyristors. In particular, applying the minimum voltage level before the thyristor turn-off makes it possible to limit the current in the external rectifier bridge to a maximum value of:

$$I_{clamp} = \frac{V_{conv}}{R_{b\ ext}}$$

The thyristor protection circuit is designed so that the thyristors can be reliably turned off at the predefined maximum current and the predefined maximum current commutation speed di/dt.

Finally, in step 66 the set thyristor turn-off sequence is applied, by active control of the power converter, to the external rectifier to turn off its thyristors. The duration of every voltage pulse is preset in advance, and is longer than the sum of the required current commutation time plus the blocking voltage recovery time of the thyristors ($T_{q\ min}$). Information about the minimum blocking voltage recovery time ($T_{q\ min}$) can be found in the datasheets of the thyristors that are used.

Figure 4:
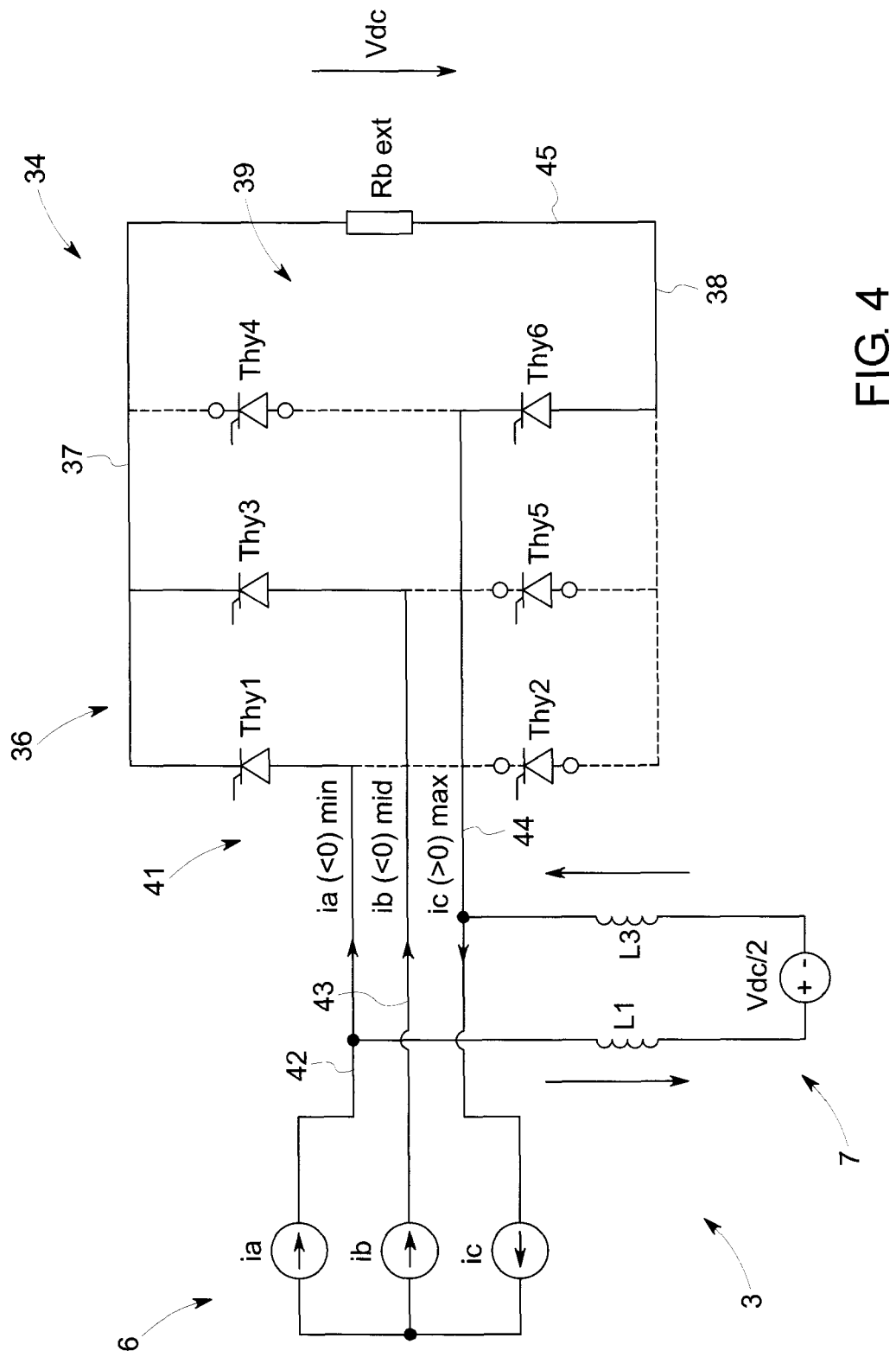
FIGS. 4, 5, and 6 are block diagrams of the power converter arrangement shown in FIG. 1 in the individual phases of the method shown in FIGS. 2 and 3, in a simplified representation.
Figure 5:
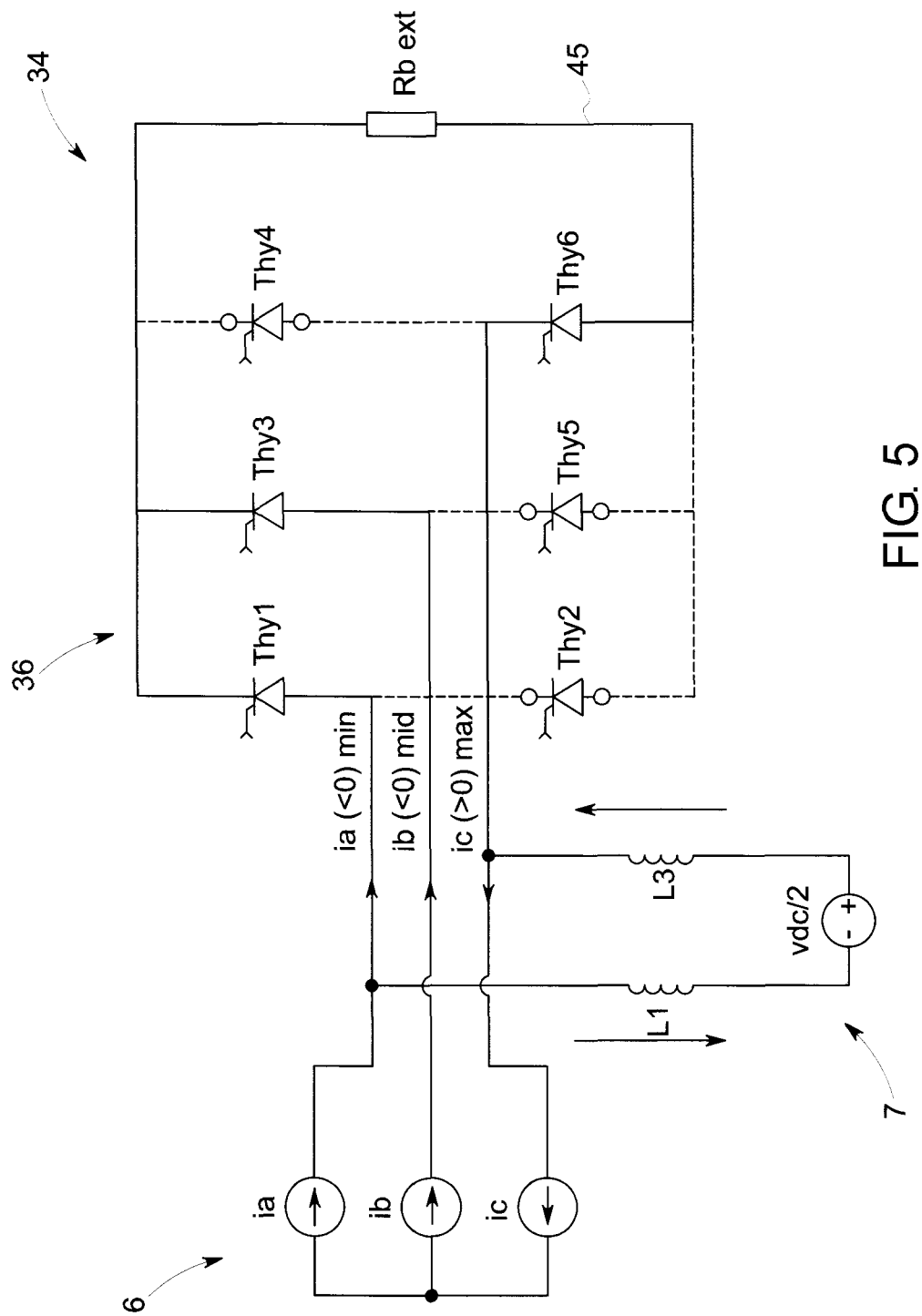
Figure 6:
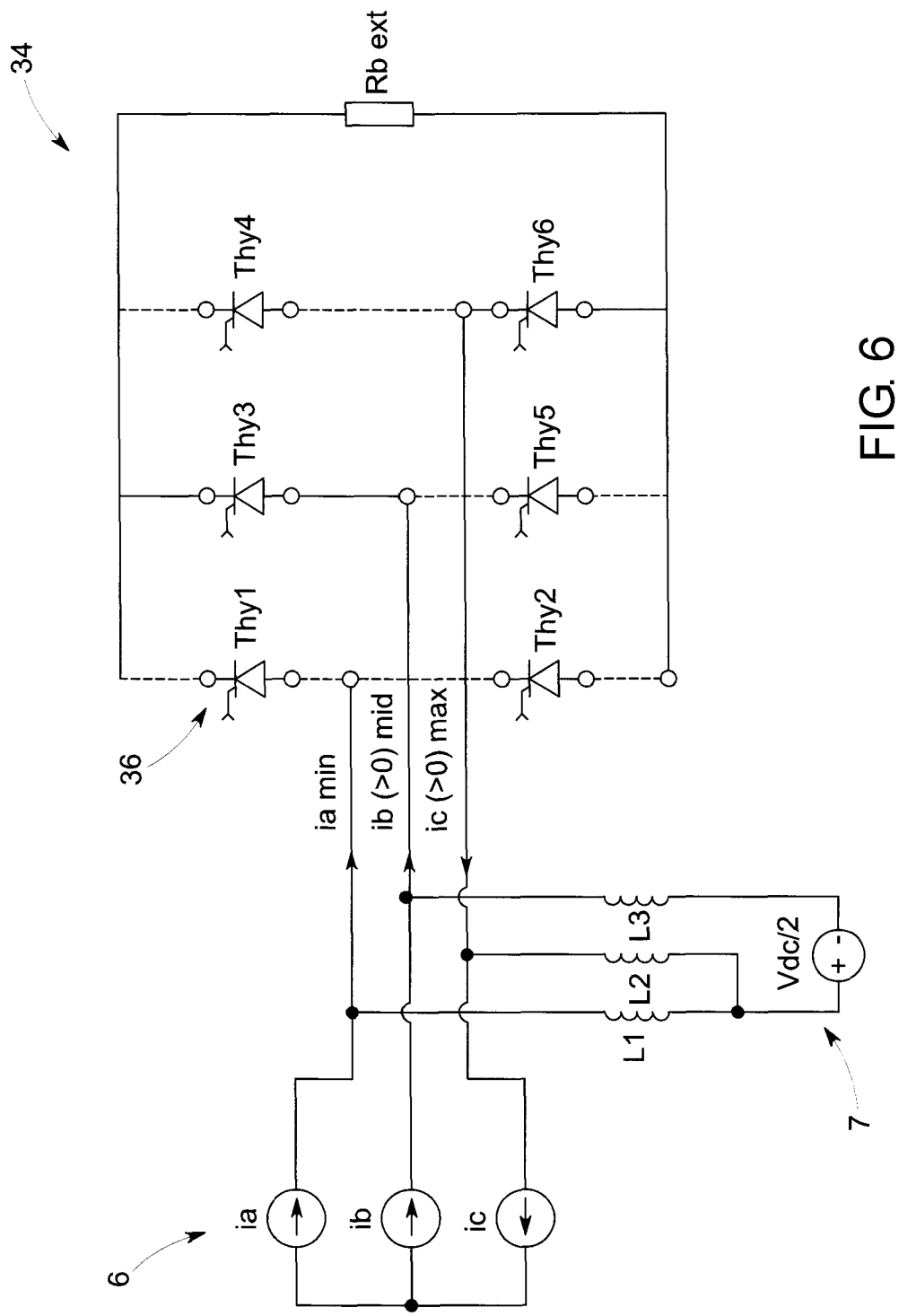

A special example that illustrates how the thyristor turn-off sequence can be constructed, if it is carried out by a 3-level power converter (for example the power converter device 7 shown in FIG. 1), is explained below in connection with FIGS. 4-6. FIGS. 4-6 show the protective device 34 with the external thyristor rectifier bridge 36 and the rotor 6 of the asynchronous machine 2 in an equivalent circuit diagram as a current source.

First, the currents of the rotor or external rectifier, for example, are either measured directly in the branch lines 42, 43, 44 in the embodiment shown in FIG. 1, or derived from measurements of the power converter and rotor currents, are classified as follows according to their amplitudes and directions: The largest current of the external rectifier that is oriented away from the rectifier 6, is classified as the max current. The largest current that is directed toward the external rectifier is classified as the min current. The remaining current is classified as the mid current. It can have any direction.

A representation of an example of momentary current directions and their classification is illustrated in FIG. 4. As was already mentioned, the turn-off sequence to be applied by the power converter involves applying the smallest voltage levels (in the case of a 3-level power converter ±$V_{dc}$/2), the number of steps required to turn off the thyristors being from two to a maximum of four. Generally speaking, four steps are only required when the current sign and conducting states of the thyristors can only be identified with difficulty, for example if the currents are relatively small.

As was already explained, in a first step the current that can be fed through the power converter to the external rectifier is reduced to the value $I_{clamp} = V_{conv}/R_{b\ ext}$. To accomplish this, the voltage $-V_{conv}$ ($-V_{dc}/2$ in the example of a 3-level power converter shown in FIG. 1) is applied across the phases that have been classified as max and min. The mid terminal is left in the floating state. This is illustrated in FIG. 4. As a consequence of step 1, the maximum current that flows through the external rectifier is limited to the value $I_{clamp}$.

It is understood that any voltage, such as, for example, $-V_{conv}$, can be applied by using various active voltage vectors, that is, by active control of different switch combinations. For example, this can be accomplished by closing the switches S1, S9 in step 1 and the example shown in FIG. 1. Alternatively, it is also possible to select the switches S7, S2 or the switches S5-S6 to achieve the same voltage vector. The respective switches depend on the power converter topology used in each case.

If the current of the external rectifier already is below the maximum current level $I_{clamp}$ prior to step 1, step 1 can be omitted and one of the thyristors can be forced to turn off by immediately applying the voltage +$V_{conv}$ between the max and min phases. This is illustrated in FIG. 5.

Otherwise, if the current limitation or clamping has been carried out in step 1, then in step 2 the turning off of one of the thyristors between the max and min phase is forced by applying the voltage +$V_{conv}$ (+$V_{dc}$/2 in the example of the 3-level power converter in FIG. 1) (see FIG. 5). The current through at least one of the thyristors is forced to zero within time interval $T_f$ which is defined by amplitude of the applied voltage pulse and inductance of the current commutation loop: $T_f = 2L*(I_{clamp}/V_{conv})$. For known system duration of the voltage pulses can be pre-calculated in advance. The actually applied voltage pulses should be longer than the current fall time in order to provide sufficient negative polarisation of the thyristor which has turned off $T_p = T_f + T_{q\ min}$.

In step 3, the rotor phases designated as min and max are interconnected through the power converter. One of the conducting thyristors in these phases has already been turned off, so that this interconnection is not absolutely necessary for the turn-off process. The purpose of this interconnection is to obviate the necessity of precisely identifying the phase that remained in the conducting state. Such an identification could be difficult or almost impossible if the residual current in the respective phase assumes an extremely low level.

After that, in step 3 the turn-off voltage is applied between the max and the min phase connected in parallel therewith and the remaining mid phase. The polarity of the applied voltage depends on the sign of the current in the mid phase. The application of step 3 is illustrated in FIG. 6. After the application of step 3, all thyristors should be turned off. However, if the current sign is misidentified due to the extremely low residual currents, the effect might be exactly the opposite, namely that the current in the external rectifier rises to the clamping level $I_{clamp}$. In this case, the reverse voltage must be applied in subsequent step 4.

Step 4 is only necessary if it is detected in step 3 that the external rectifier currents remain high despite the application of step 3. Then, the voltage from step 3 with the opposite polarity is applied between the parallel connection of the max and min phases and the mid phase. After that at the latest, all thyristors are finally turned off.

In every case, the duration of the steps or the application of the voltage pulses should be longer than the recovery time of the thyristors used, which is usually about 500 microseconds, to ensure inverse polarization of the turned off thyristors before continuing with the next step.

The method to protect the power converter arrangement and the power converter arrangement 34 according to embodiments of the present invention allow effective protection for the power converter arrangement 3 and other components of the system 1. In particular, the method and the power converter arrangement allow improved turning off of thyristors in an external rectifier bridge, which is used, together with a brake resistor, as an external bypass device for protection against strong transient surge currents. The thyristors of the external rectifier bridge are turned off using an improved synthesis and by applying active voltage vectors of the power converter in an optimized thyristor turn-off sequence. Embodiments of the invention take into consideration the power converter topology and information that is determined about the current conducting states of the thyristors to force them to turn off rapidly but in a careful manner, minimizing the load on the system components.

Numerous modifications are possible within the scope of the application. While the embodiments of the invention are described, e.g., in connection with a voltage source power converter, here especially a 3-level 3-phase NPP power converter, it is also possible for other power converter topologies to be used, such as, for example, an NPC power converter, with at least two voltage levels and three or more phases, a Modular Multilevel Converter based on half or full H bridge design, and other multilevel converter topologies. While the rectifier bridge 36 here is further illustrated as a B6 thyristor bridge, it is also possible, e.g., for the lower (or upper) thyristors in FIG. 1 Thy2, Thy4, Thy6 to be replaced, for example, by diodes or other rectifier elements. Embodiments of the invention are also applicable to such a rectifier bridge. Furthermore, instead of the doubly fed induction machine 2, other consumers can also be connected to the AC side 9, like in series voltage compensators or hybrid power filters, and the embodiments are equally applicable in all these systems where the grid voltage perturbations can produce surge currents that are fed to the power converter and that could lead to damage of the power converter components. Moreover, it is understood that the method according to embodiments of the present invention, as shown in FIGS. 2 and 3, is described in connection with a sequence of method steps, but that another order of the steps could also be selected and that it might also be possible to omit individual steps.

Figure 7:
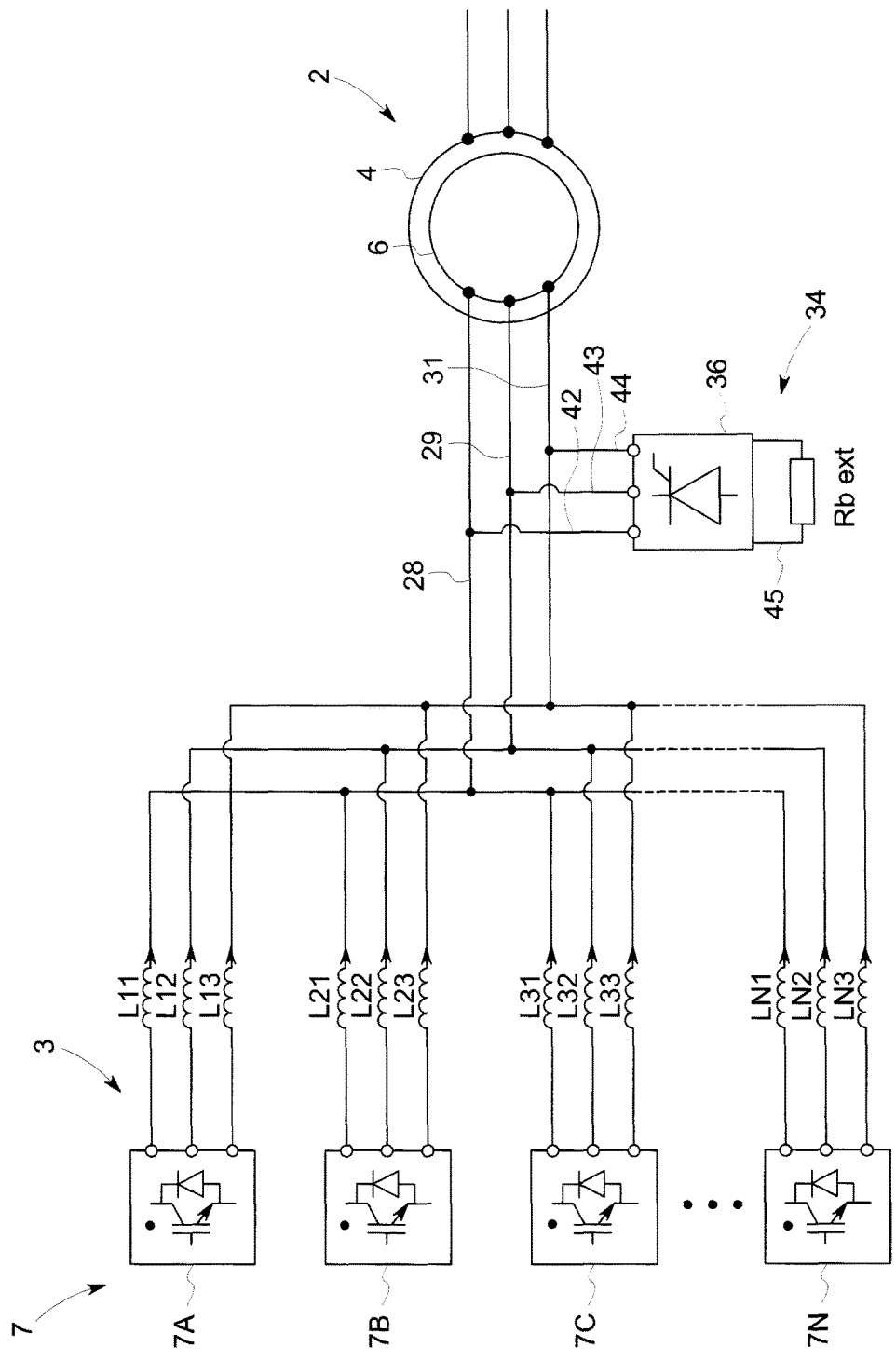
FIG. 7 is a block diagram of an exemplary system with a doubly fed induction machine and a power converter arrangement therefor, which has several multi-level power converters connected in parallel, and with a protective device for the inventive power converter arrangement, in a simplified representation.

Another possible modification of embodiments of the invention is illustrated in FIG. 7. As can be seen from this figure, the power converter device 7 can consist of a number of power converters 7*a*, 7*b*, 7*c* . . . , 7N that are connected in parallel. In such systems with paralleled power converters, the switching of the power converters can be interleaved such that it is possible to produce corresponding multi-level output voltages which exceed the number of levels of the individual power converters. The parallel power converters 7*a*-7N are connected with a common protective device 34 that has a rectifier bridge with rectifier elements, at least some of which are formed by thyristors, and a brake resistor $R_{b\ ext}$ connected to the DC voltage output of the rectifier bridge. The rectifier bridge can be the thyristor bridge 36 shown in FIG. 1, for example. The method according to embodiments of the invention can be used on such a system with parallel power converters, it being possible to turn off the thyristors of the rectifier bridge using any active voltage vectors that can be produced with the parallel power converters 7*a*-7N.

A method is disclosed to protect a power converter arrangement with a power converter that has a DC side that is connected to a DC intermediate circuit, an AC side, and controllable switches that can be controllably switched at a high frequency to invert the DC voltage of the DC intermediate circuit into an AC voltage. A protective device that can be activated and deactivated is provided to protect the power converter from overload by connecting an external thyristor rectifier bridge with a brake resistor $R_{b\ ext}$ to the AC side of the power converter. If a predetermined error situation is detected, 51, the external thyristors are triggered to turn on, to activate the protective device, 52. If it is detected that the predetermined error situation has disappeared, 53, the external thyristors are turned off, 54, by ending the triggering of the thyristors and actively controlling the power converter switches to produce a sequence of voltage pulses of suitable polarity and amplitude to serve as a thyristor turn-off sequence that is applied to the protective device to force commutation of the current from the protective device to the power converter, to deactivate the protective device. A power converter arrangement with a device to protect against overload is also disclosed.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A method to protect a power converter arrangement with a power converter device that has a direct current side that is connected with a DC intermediate circuit, an alternating current side, and controllable switching elements that can be controllably switched at a high frequency to convert the DC voltage of the DC intermediate circuit into a multi-phase AC voltage, the method comprising:

providing a protective device, that can be activated and deactivated, to protect the power converter device from overload by connecting a rectifier circuit with rectifier elements, at least some of which are thyristors, to the AC side of the power converter device, and connecting a bypass branch to a DC side of the rectifier circuit, the bypass branch having a brake resistor for transforming energy dissipated from the AC side of the power converter device into thermal energy, when necessary; and if a predetermined error situation is detected, triggering the thyristors of the rectifier circuit to turn them on, to activate the protective device; and if it is detected that the predetermined error situation disappears, turning off the thyristors of the rectifier circuit by ending the triggering of the thyristors and actively controlling the power converter switching elements to produce a sequence of voltage pulses of suitable polarity and amplitude to serve as a thyristor turn-off sequence which is applied to the protective device to force commutation of the current from the protective device to the power converter to deactivate the protective device;

wherein to limit a current commutation speed (di/dt) when the thyristors of the protective device are turned off, the switching elements of the power converter device apply voltage pulses with a reduced amplitude $V_{conv}$, to the protective device, according to the following equation:

$$V_{conv} = \frac{V_{dc}}{m-1},$$

where $V_{dc}$ is the positive voltage of the DC intermediate circuit and m corresponds to the number of levels of the multi-level power converter.

2. The method of claim 1, wherein if the predetermined error situation is detected, the switching elements are controlled to open, and all switching elements are kept open until it is detected that the predetermined error situation has disappeared.

3. The method of claim 1, wherein to produce the thyristor turn-off sequence, the polarity and amplitudes of the currents in the protective device are monitored to determine the suitable sequence and polarity of voltage pulses.

4. The method of claim 1, further comprising providing an internal brake chopper device, which monitors and protects the intermediate circuit voltage, the brake chopper device having at least one internal brake resistor that transforms excess energy in the intermediate circuit into thermal energy, and at least one switch controllable by pulse-width modulation to allow or prevent a current flow through the at least one internal brake resistor, the protective device being activated if the duty ratio of the at least one switch reaches 100%.

5. The method of claim 1, wherein inductors are further arranged between the power converter device and the protective device to limit the rate of change of the commutation current.

6. The method of claim 1, wherein before the triggering of the switching elements of the power converter device to turn off the thyristors, the current through the bypass branch comprising the external brake resistor $R_{b\_ext}$ is limited to a value $I_{clamp}$ by applying a voltage pulse with reduced amplitude $V_{conv}$, such that:

$$I_{clamp} = \frac{V_{conv}}{R_{b\_ext}}.$$

7. The method of claim 1, wherein the thyristor turn-off sequence comprises the following steps:
applying a first voltage pulse having a certain voltage amplitude and polarity between a first phase line and a second phase line, to which the rectifier circuit is connected;
applying another voltage pulse having the reverse polarity between these phase lines;
subsequently applying yet another voltage pulse having a certain voltage amplitude and polarity between the first and second phase lines, which are connected in parallel with one another, and a third phase line, to which the rectifier circuit is connected; and
applying a voltage pulse of reverse polarity between the phase lines.

8. The method of claim 1, wherein once the error situation is past and the current has commutated from the protective device to the power converter device, a normal operating mode is resumed in which the controllable switching elements of the power converter device are controlled at the high frequency by pulse-width modulation to invert the DC voltage of the DC intermediate circuit.

9. A power converter arrangement comprising:
a power converter device that has a direct current side that is connected with a DC intermediate circuit, an alternating current voltage side, and controllable switching elements that can be controllably switched at a high frequency to convert the DC voltage of the DC intermediate circuit into a multi-phase AC voltage to feed the AC side;
a protective device, that can be activated and deactivated, to protect the power converter device from overload, the protective device having a rectifier circuit that is connected to the AC side of the power converter device and having rectifier elements, at least some of which are thyristors, and a bypass branch that is connected to a DC side of the rectifier circuit, the bypass branch having a brake resistor for transforming energy dissipated from the AC side of the power converter device into thermal energy, when necessary; and
a control device for controlling the thyristors of the rectifier circuit, to selectively turn on and off the thyristors, to activate or deactivate, respectively, the protective device;
the control device being configured to selectively turn off the thyristors of the rectifier circuit to deactivate the protective device by actively controlling the switching elements of the power converter device to produce a sequence of voltage pulses of suitable polarity and amplitude to serve as a thyristor turn-off sequence which is applied to the protective device to force commutation of the current from the protective device to the power converter device;
wherein to limit a current commutation speed (di/dt) when the thyristors of the protective device are turned off, the switching elements of the power converter device apply voltage pulses with a reduced amplitude $V_{conv}$, to the protective device, according to the following equation:

$$V_{conv} = \frac{V_{dc}}{m-1},$$

where $V_{dc}$ is the positive voltage of the DC intermediate circuit and m corresponds to the number of levels of the multi-level power converter.

10. The power converter arrangement of claim 9, wherein the control device is part of a controller for the power converter device which in normal operating mode controls the switching elements at the high frequency by pulse-width modulation, to invert the DC voltage of the DC intermediate circuit.

11. The power converter arrangement of claim 9, wherein the control device is configured to recognize predetermined error situations, and thereupon to control the switching elements to open them, and keep all switching elements open until it detects that the error situation has disappeared.

12. The power converter arrangement of claim 9, wherein the control device is configured to monitor the polarities and amplitudes of the currents in the protective device.

13. The power converter arrangement of claim 9, wherein the power converter device further comprises means for rectifying the AC voltage of the AC side and feeding it into the DC intermediate circuit.

14. The power converter arrangement of claim 9, wherein the power converter device has an m-level n-phase power converter, where m >=2 and n >=3.

15. The power converter arrangement of claim 9, wherein the power converter device has an internal brake chopper device that monitors and protects the intermediate circuit voltage, the brake chopper device comprising at least one internal brake resistor that transforms excess energy in the DC intermediate circuit into thermal energy, and at least one controllable switch that selectively allows or prevents a current flow through the at least one internal brake resistor.

16. The power converter arrangement of claim 9, wherein inductors are arranged between the power converter device and the protective device to limit the rate of change of the commutation current.

17. The power converter arrangement of claim 9, wherein the rectifier circuit is formed by a multi-phase thyristor bridge.

18. The power converter arrangement of claim 9, wherein the power converter arrangement is configured to control a rotor current in a rotor circuit of a doubly fed induction machine.

* * * * *